2,776,672

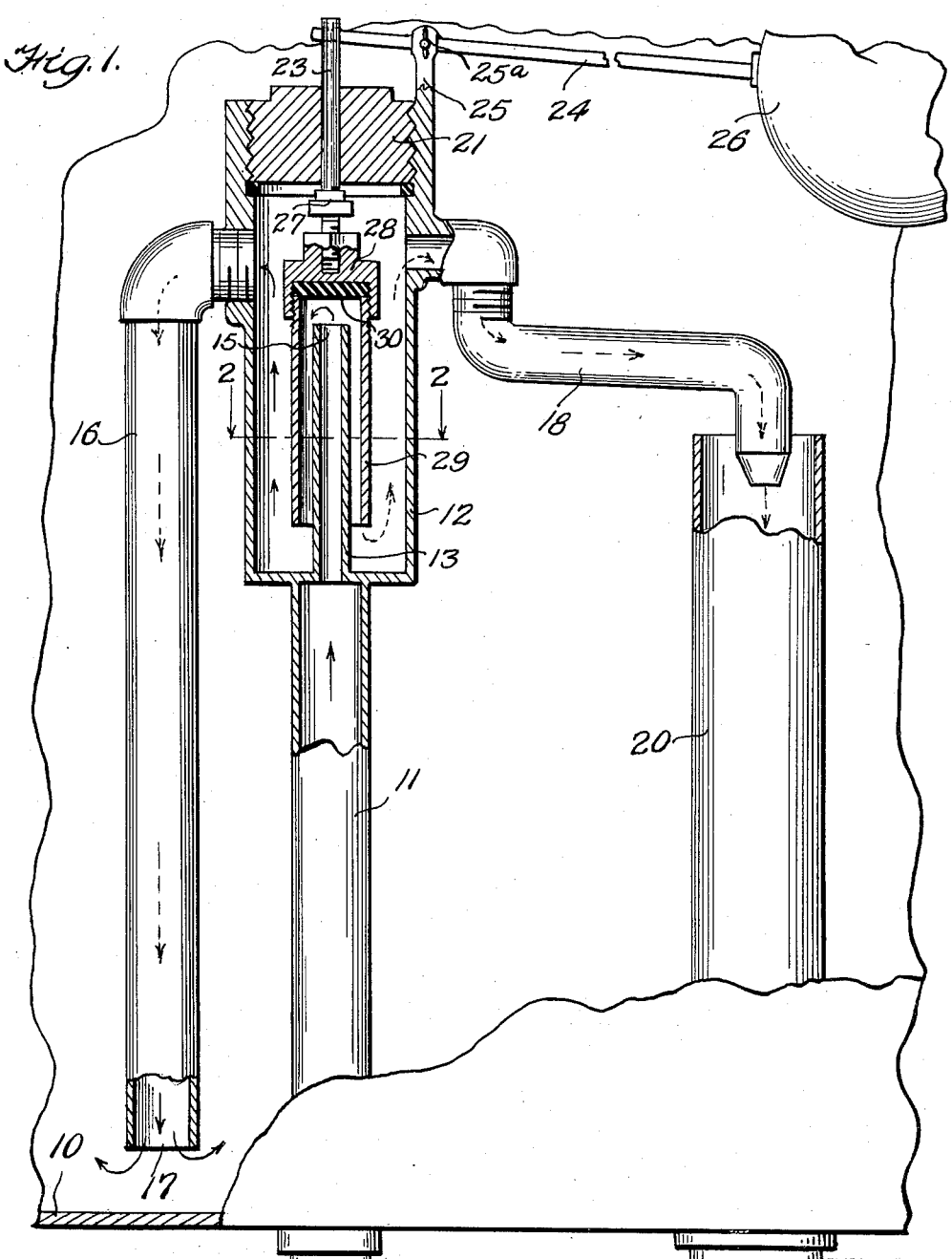
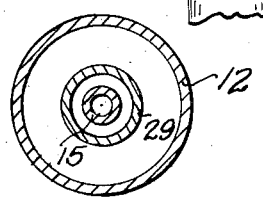

FLUSH TANK VALVE

Carl Leon Faber, Miami, Fla.

Application January 25, 1954, Serial No. 405,811

1 Claim. (Cl. 137—437)

This invention relates to a flush tank valve, and has for one of its objects the production of a simple and efficient valve wherein the washer thereof may be easily replaced when necessary to control the flow of water into a flush tank.

A further object of this invention is the production of a flush tank valve which is so constructed as to eliminate the humming noise often heard in mechanisms of this character.

Another object of this invention is the production of a flush tank valve which will reduce the pressure of water flowing into a flush tank and into the overflow pipe.

Other objects and advantages of the present invention will appear throughout the following specification and claim.

In the drawing:

Figure 1 is a vertical sectional view of the valve mechanism, certain parts of the tank and associate elements being shown in elevation;

Figure 2 is a transverse sectional view taken on line 2—2 of Figure 1.

By referring to the drawing in detail, it will be seen that 10 designates a conventional flush tank which carries the vertical inlet pipe 11. An enlarged housing 12 is carried by the upper end of the inlet pipe 11, in which housing 12 is carried a reduced vertical inlet extension 13 communicating at its lower end 14 with the inlet pipe 11. The upper end of the extension 13 is open and defines a valve seat 15.

An outlet pipe 16 communicates with the housing 12 at a point above the upper discharge end or valve seat 15 of the extension 13. The lower end 17 terminates near the bottom of the tank 10, as shown in Figure 1. An overflow extension 18 communicates with the port 19 in the housing 12 at an elevation above the valve seat 15 of the extension 13. This overflow extension 18 empties into the upper end of the upstanding overflow pipe 20 of the conventional type.

A removable threaded plug 21 fits in the upper end of the housing 12 and is seated upon the gasket 22. A vertical stem 23 extends through the plug 21 and is reciprocally mounted so as to move upwardly and downwardly. A conventional float lever 24 is pivotally mounted upon an arm 25 by means of a suitable thumb-screw 25a, which arm is carried by the upper end of the housing 12. A float ball 26 is carried by the outer end of the lever 24 and the inner end of the lever 24 engages the stem 23 in a conventional manner to raise and lower the stem 23 as the lever 24 is swung. The stem 23 carries an abutment nut 27 to limit the upward movement of the stem 23, and the lower end of the stem 23 is threaded into the upper end of a cap 28 to adjustably attach the stem 23 to the cap 28.

A hush pipe 29 of smaller diameter than said threaded plug is telescoped over the inlet extension 13, in the manner shown in Figure 1, and the upper end of the hush pipe 29 is threaded into the cap 28 to abut the sealing valve gasket 30. This gasket 30 is preferably of rubber or of any suitable material which will provide a sealing fit upon the valve seat 15 of the inlet extension 13 when the gasket is forced to a closing position upon the seat 15. The gasket 30 is fitted within the cap 28 and between the cap and upper end of the hush pipe 29 in a manner to hold the gasket firmly in place. This gasket 30 may be easily removed by unthreading the hushpipe 29 from the cap 28 and a new gasket may be inserted when repair or replacement is necessary.

By considering Figure 1, it will be seen that the lever 24 may be detached from the stem 23, and the plug 21 and stem may then be removed from the housing 12. The cap 28 and hush pipe 29 will be removed from the housing 12 as the plug 21 and stem 23 are removed, since they are all connected together. After removal, the hush pipe 29 may be unthreaded from the cap 28 so that the gasket 30 which is clamped between the cap 28 and the upper end of the pipe 29, may be replaced. The renewal of the gasket 30 is therefore a very simple operation since it is only necessary to remove the thumb-screw 25a, the plug 21 and to separate the hush pipe 29 from the cap 28. The present device maintains the water at a correct level in the toilet bowl and is practically noiseless when filling the tank, due to the circuitous path which is followed by the water passing through the housing 12 to the outlet pipe 16, thereby avoiding the humming noise often heard in other devices. The device is easy to install and the adjustment remains constant. About the only repairs under ordinary wear would be the replacement of the gasket or washer 30 from time to time. Furthermore, the structure illustrated and described avoids the spurting of water around the top of the valve. The water flowing into the overflow pipe is more or less by gravity and has little force behind it so that noise is reduced to a minimum.

Because of the structure set forth above, the present flush tank valve is simple and efficient and provides for easy replacement of the gasket 30 which controls the flow of water into the tank 10. The structure also eliminates the usual humming sound, and is practically noiseless. Furthermore, water is always held at the desired level in the toilet bowl. Since water flows into the overflow pipe by gravity and with little force, this lessens noise and quiet operation is further provided by eliminating the usual spurting of water around the top of the valve. By means of the present device, the float ball 26 is always held in the proper position and is prevented from falling to the bottom of the tank and interfering with other operation portions of the device. Only two working parts are employed and only one gasket, such as the gasket 30, need be replaced when necessary. There is no way for the device to get out of adjustment and anyone with a pair of pliers may quickly replace the gasket 30 that controls the flow of water into the tank 10. The pipe 18 which conveys the water to the overflow pipe 20 and keeps the water at a proper level in the toilet bowl and does not leak and does not require periodic adjustment and there is nothing to get out of order.

It should be understood that certain detail changes may be made in the device illustrated within the spirit of the invention, so long as these changes fall within the scope of the appended claim.

Having described the invention, what is claimed as new is:

A device of the class described comprising a tank, a water inlet pipe having an enlarged housing carried by the upper end of said inlet pipe, a removable threaded plug closing the outer end of said housing, said inlet pipe having an extension reduced in diameter relative to said inlet pipe and housing projecting vertically within said housing, said extension having an outlet end, a hush pipe telescoped over said extension and mounted in said housing, a sealing gasket removably fitted within said hush pipe and adapted to engage and close the outlet end of said extension, a cap of greater diameter than said hush pipe closing the outer end of said hush pipe to facilitate the removal of said gasket, said sealing gasket being clamped between one end of said hush pipe and cap, a stem slidably mounted in said plug and adjustably connected to said cap, a float connected to said stem for actuating said stem as water rises and falls in said tank to selectively open and close the outlet end of said extension, an outlet pipe leading from the upper end of said housing, and an abutment nut carried by said stem for abutting engagement with said plug to limit the upward movement of said stem.

References Cited in the file of this patent
UNITED STATES PATENTS

| | | |
|---|---|---|
| 608,897 | McPartland | Aug. 9, 1898 |
| 955,457 | Geurink | Apr. 19, 1910 |
| 1,314,160 | Stengel | Aug. 26, 1919 |
| 1,389,907 | Sherwood | Sept. 6, 1921 |